(12) United States Patent
Whitaker et al.

(10) Patent No.: US 9,108,506 B2
(45) Date of Patent: Aug. 18, 2015

(54) NANOLAMINATE-REINFORCED METAL COMPOSITE TANK MATERIAL AND DESIGN FOR STORAGE OF FLAMMABLE AND COMBUSTIBLE FLUIDS

(75) Inventors: John D. Whitaker, Seattle, WA (US); Christina A. Lomasney, Sammamish, WA (US)

(73) Assignee: Modumetal, Inc., Seattle, WA (US)

( * ) Notice: Subject to any disclaimer, the term of this patent is extended or adjusted under 35 U.S.C. 154(b) by 1487 days.

(21) Appl. No.: 12/667,900

(22) PCT Filed: Jul. 7, 2008

(86) PCT No.: PCT/US2008/069325
§ 371 (c)(1),
(2), (4) Date: Apr. 12, 2011

(87) PCT Pub. No.: WO2009/045593
PCT Pub. Date: Apr. 9, 2009

(65) Prior Publication Data
US 2011/0186582 A1    Aug. 4, 2011

Related U.S. Application Data

(60) Provisional application No. 60/948,303, filed on Jul. 6, 2007.

(51) Int. Cl.
*B60K 15/03* (2006.01)
*B60K 15/077* (2006.01)
*B22F 7/00* (2006.01)
*C25D 5/10* (2006.01)
*C25D 7/00* (2006.01)
*C25D 15/02* (2006.01)
*F42D 5/04* (2006.01)

(52) U.S. Cl.
CPC ............ *B60K 15/03* (2013.01); *B22F 7/004* (2013.01); *C25D 5/10* (2013.01); *C25D 7/00* (2013.01); *C25D 15/02* (2013.01); *F42D 5/04* (2013.01); *B22F 2998/10* (2013.01); *B60K 2015/0344* (2013.01); *B60K 2015/0777* (2013.01)

(58) Field of Classification Search
CPC ................. B60K 15/077–15/0777; B60K 15/03–15/03519
USPC ....................................... 205/131, 183–190
See application file for complete search history.

(56) References Cited

U.S. PATENT DOCUMENTS 5,547,096 A    8/1996   Kleyn ................ 220/4.14
6,415,942 B1 *  7/2002   Fenton et al. .......... 220/563

FOREIGN PATENT DOCUMENTS

EP      1498976       1/2005
WO    WO 2007/021980   2/2007
WO    WO 2007/045466   4/2007

* cited by examiner

*Primary Examiner* — James Lin
*Assistant Examiner* — Ho-Sung Chung
(74) *Attorney, Agent, or Firm* — Perkins Coie LLP

(57) ABSTRACT

An improved fuel tank and method of forming a fuel tank utilize reinforced porous metal composite materials. In one embodiment, the composite material includes a fully dense, fluid-impermeable skin combined with a porous metal baffle. The skin and baffle may be formed as a single monolithic system via electrodeposition of a nanolaminate material into at least a portion of open, accessible void space within a porous preform (e.g., a metal foam preform) and on the exterior surface of the preform to form the fluid-impermeable skin.

11 Claims, 13 Drawing Sheets

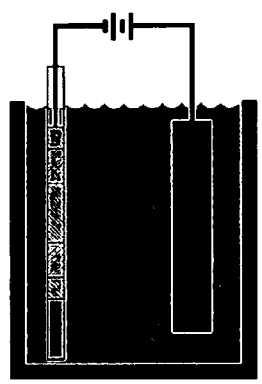
Figure 8A
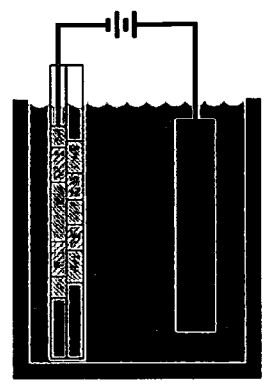
Figure 8B
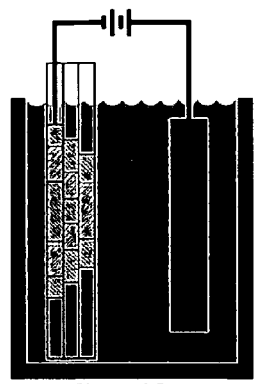
Figure 8C
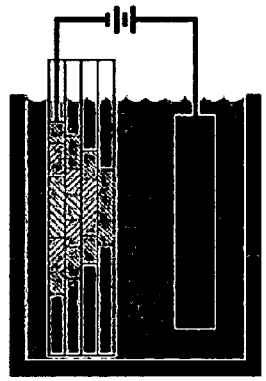
Figure 8D
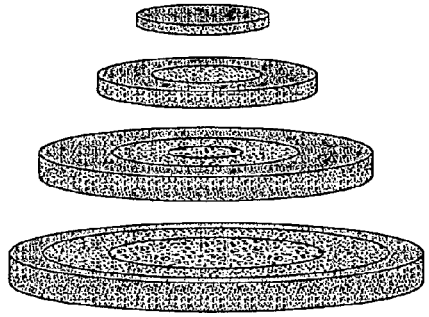
Figure 8E
Figure 8.

← Growth Direction →

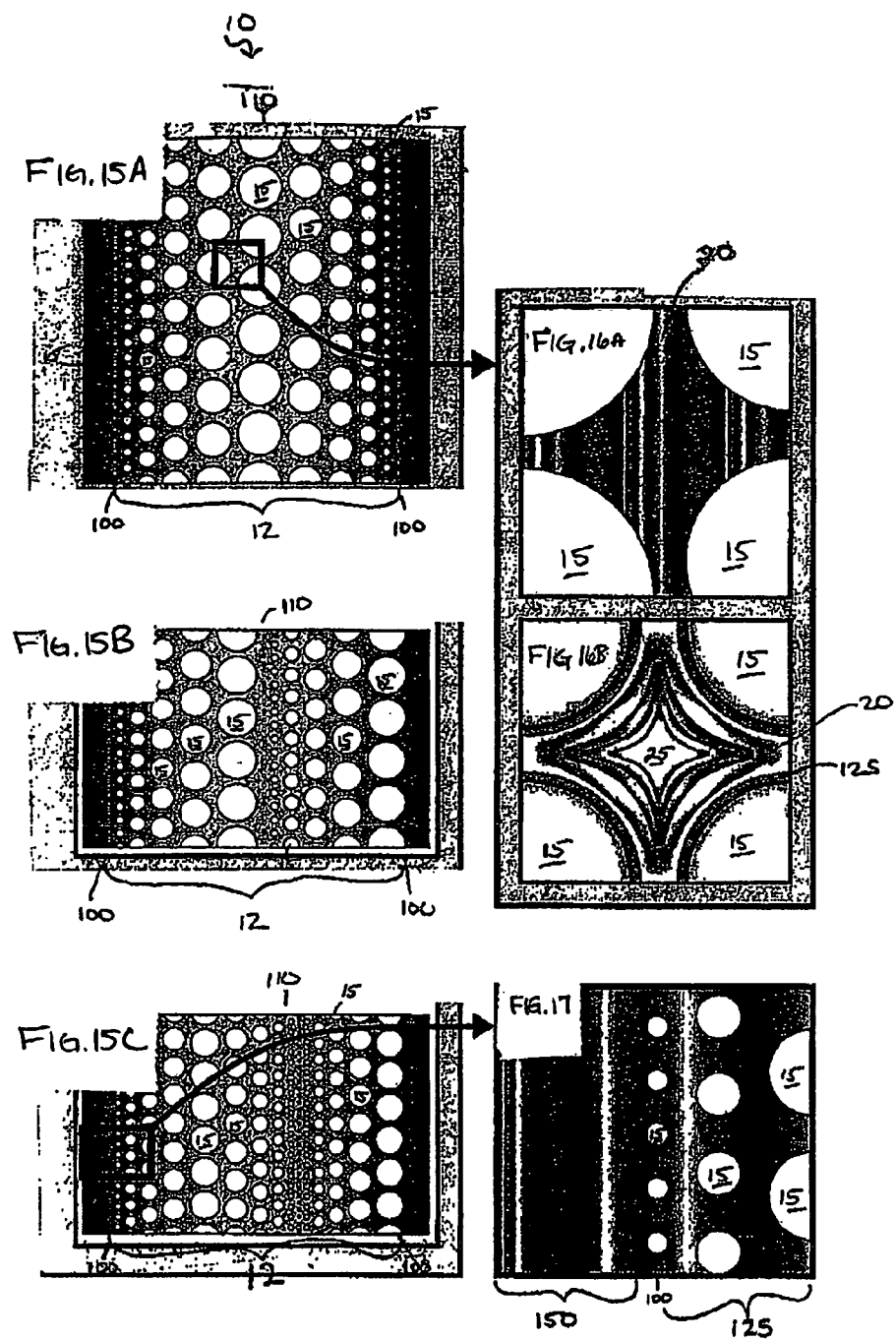

NANOLAMINATE-REINFORCED METAL COMPOSITE TANK MATERIAL AND DESIGN FOR STORAGE OF FLAMMABLE AND COMBUSTIBLE FLUIDS

This application is a 371 of International Application No. PCT/US2008/069325 filed Jul. 7, 2008, which published as WO 2009/045593, and which claims priority to Provisional Application No. 60/948,303 filed Jul. 6, 2007. The entire contents of the above-identified applications are hereby incorporated by reference.

FIELD OF THE DISCLOSURE

This disclosure relates to an improved material, process, and design for constructing storage tanks for flammable and combustible fluids. Storage tanks produced using the disclosed methods and materials will a) reduce the risks of flame spread and explosion in the event of both low- and high-strain-rate (ballistic) impacts, b) allow for the production of arbitrary, conformable tank geometries, and c) provide enhanced strength-to-weight ratios over existing storage tanks for combustible and flammable fluid storage. Additional advantages afforded by the claimed material include resistance to chemical attack and enhanced dissipation of both heat and static charge.

BACKGROUND

Vehicles (automobiles, tanks, airplanes, boats, etc.) typically possess fuel tanks in which liquid fuel is free to move, or 'slosh', often resulting in a build up of static charge and an accompanying risk of ignition and subsequent explosion. Additionally, both liquid and gaseous fuel can escape unimpeded from conventional fuel tanks in the event of an accidental or intentional penetration of the tank. The risk of explosion and rapidly spreading flames resulting from either of these factors pose serious threats to the vehicle, vehicle occupants, and people or structures in the area.

In the case of liquid fuels, baffles comprising open cellular foams have been used extensively in the aircraft and racing industries to mitigate the effects of liquid fuel sloshing and leakage. One form of baffle, for example, comprises an open cellular plastic foam, such as SafeCrest® foam, available from Crest Foam Industries, Inc. Moonachie, N.J., USA. Such foams are generally applied inside of the fuel tank after construction via cut and placement, post placement expansion (see for example, U.S. Pat. No. 4,764,408) or spray foam application (see for example, www.crestfoam.com). The advantages of such foams include reduced fuel spillage and reduced atomization that results from fuel being trapped inside of the foam cells in case of a tank perforation. As a result, such fuel tank systems mitigate fireball occurrence.

The plastic foam baffles tend to chemically degrade over time, and the debris generated can plug fuel filter systems. The foam baffles also complicate fueling procedures as the fuel tends to foam on contact with the baffle system, thus limiting fueling rates. Debris may also build up and block the foam, thereby reducing fuel tank volume. Furthermore, while plastic foam baffle systems help mitigate spillage in the case of a tank penetration, these foams provide little to no structural reinforcement and therefore do not inhibit the penetration itself. Finally, they are neither thermally nor electrically conductive, and therefore cannot dissipate static charge or heat.

U.S. Pat. No. 4,844,974 describes electrically conductive, chemically resistant carbonaceous fibers which, when packed within a fluid storage vessel, prevent sloshing of the fluid and dissipate static electricity buildup. These fibers further serve to absorb liquid fuels, thereby reducing their mobility and slowing their combustion. While inhibiting flame spread and explosion, the materials of U.S. Pat. No. 4,844,974 provide minimal structural reinforcement, and therefore do not enhance resistance of the storage container to puncture.

SUMMARY OF THE DISCLOSURE

The present disclosure applies to storage of pressurized gases, especially those used as vehicle fuel where tank volume, weight, shape, and strength all contribute to the overall energy density of the gaseous fuel. By employing composite materials, and in particular composite materials including a nanolaminated alloy, higher strength-to-weight and strength-to-volume ratios can be achieved compared with conventional pressurized gas storage tanks, resulting in higher energy densities and greater vehicle traveling distance. Compressed hydrogen storage is one example of such an application.

One aspect of the present disclosure is to provide a material for the construction of storage tanks for combustible and flammable fluids which incorporates the benefits of an open cellular baffle system with the advantageous material properties of a nanolaminated alloy in order to protect against tank penetration and reduce the risk of flame spread and explosion in case of a tank penetration.

Another aspect of this disclosure is to provide a method for the production of said storage tanks which allows for control of the nanolaminate alloy composition such that, for example, highly corrosion and chemical resistant alloys can be incorporated into the design, specific structural and protective characteristics can be met, and/or specific tank geometries may be realized.

In yet another aspect, the present disclosure provides a design, employing said material, for a fuel tank which both resists penetration by ballistic impacts, prevents or lessens flame spread and explosion in the event of penetration, and prevents or lessens fuel foaming during fueling operations.

In a further aspect, embodiments described in the present disclosure are directed to a fuel tank. The fuel tank includes a porous metal baffle and a fluid impermeable vessel defining a fuel storage area. The porous metal baffle is disposed within the fuel storage area. Such embodiments can include one or more of the following features. The porous metal baffle can include a porous body defining an accessible, interior void structure. In some embodiments, a nanolaminate coating is disposed within the accessible, interior void structure. The nanolaminate coating can provide reinforcement to the porous body. In some embodiments, the nanolaminate coating is compositionally modulated. The nanolaminate coating can include a corrosion-resistant protective alloy, such as, for example, an alloy comprising about 70% Ni and about 30% Cu. In some embodiments, the fluid impermeable vessel comprises an exterior shell including a nanolaminated material. The nanolaminated material can include a corrosion-resistant protective alloy. The fuel tank can also include a force distributing layer and a ballistic penetration prevention layer disposed on the exterior shell of the vessel. In some embodiments, the porous metal baffle and the fluid impermeable vessel are integrally formed. In some embodiments, the porous metal baffle is formed from a consolidated preform, such as, for example, a foam, a fabric, or honeycomb structure. In other embodiments, the porous metal baffle is formed from an unconsolidated material, such as, a bed of particles or beads, or a fiber tow. In some embodiments, the fuel storage area of the fuel tank comprises at least about 0.5% metal foam by volume.

In another aspect, embodiments described in the present disclosure are directed to a method of producing a fuel tank. The method includes laying a conductive porous preform in contact with an inside surface of a fuel tank vessel; filling the vessel with an electrolyte bath including one or more electrodepositable materials; creating a current pathway by attaching a first electrode to the porous preform and disposing a second electrode in the electrolyte bath; and applying power to the first and second electrodes to form a nanolaminate coating on the porous preform. The method can further include melting or etching the porous preform to form a nanolaminate structure. In some embodiments, the nanolaminate coating is a corrosion-resistant protective alloy.

In another aspect, embodiments of the disclosure are directed to a method of producing a fuel tank. This method includes obtaining an electrolyte bath including one or more electrodepositable species; immersing a porous preform in the electrolyte bath; creating a current pathway by attaching a first electrode to the porous preform and a second electrode to the electrolyte bath; and applying power to the first and second electrodes to form a nanolaminate coating on the porous preform. In some embodiments, this method can further include applying one or more layers of conductive fabric on the nanolaminate coated porous preform; and depositing a second nanolaminate coating on the conductive fabric. In some embodiments, the method can also include melting or etching the porous preform to form a porous nanolaminate structure. The method can also feature a corrosion resistant nanolaminate coating.

In yet a further aspect, embodiments of the disclosure are directed to a method of manufacturing a functionally graded composite material. This method includes obtaining a first functionally graded porous preform; depositing a first nanolaminated material on the first functionally graded porous preform; positioning a second functionally graded porous preform in contact with the nanolaminated first functionally graded porous preform; and depositing a second nanolaminated material on the second functionally graded porous preform and the first functionally graded porous preform to fuse the first and second graded porous preforms. This method can further include, in some embodiments, positioning a third porous preform in contact with the nanolaminated second functionally graded porous preform and depositing a third nanolaminated material to fuse the third porous preform to the second functionally graded porous preform. Embodiments of this method can also feature functionally graded porous preforms that include a foam of radially graded pores per inch.

In another aspect, embodiments of the disclosure are directed to a composite material for use in the construction of a liquid transport vessel. The composite material includes a porous metal reinforcing material and a metal liner. The porous metal reinforcing material and the metal liner form a single monolithic system (i.e., the porous metal reinforcing material and metal liner are integrally formed).

Embodiments of this aspect of the disclosure can include one or more of the following features. The porous metal reinforcing material, in some embodiments, includes a substrate material defining an accessible interior void structure and an electrodeposited material at least partially disposed within the accessible interior void structure. The electrodeposited material can be compositionally modulated through its thickness to form an electrodeposit. The electrodeposit can have a modulation wavelength that is less than about 1 micron (e.g., 200 nanometers, 150 nanometers, 80 nanometers, 25 nanometers, 20 nanometers, 10 nanometers, 5 nanometers, 1 nanometer) within at least a portion of the electrodeposit. The electrodeposited material, in some embodiments, is a metal or metal alloy and can include at least one of nickel, iron, copper, cobalt, gold, silver, platinum, and combinations thereof. In another embodiment, the electrodeposited material includes a polymer. In some embodiments, the electrodeposit has a thickness that continuously increases through a portion of the preform.

In another aspect, embodiments of the disclosure are directed to a method for forming a fuel tank. The method includes providing a bladder in the form of a final fuel tank form; lining an interior of the bladder with a porous preform including an accessible interior void structure; connecting the porous preform to a first electrode; filling the bladder with a bath including at least two electrodepositable species; inserting a second electrode into the bath; and applying a voltage or current to the first electrode to electrodeposit a material within the accessible interior void structure of the porous preform.

Embodiments of this aspect of the disclosure can include one or more of the following features. The porous preform, in some embodiments, possess a gradient in porosity. That is, the porosity varies through the porous preform. In some embodiments the porous preform includes a consolidated material, such as, for example, a foam, a felt, or a honeycomb. In other embodiments the porous preform includes an unconsolidated material, such as, for example, a bed of particles or beads. The method can further include electrodepositing a compositionally modulated layer on an exterior surface of the porous preform. In some embodiments, the voltage or current applied to the first electrode varies with time.

BRIEF DESCRIPTION OF DRAWINGS

In the drawings, like reference characters generally refer to the same parts throughout the different views. Also, the drawings are not necessarily to scale, emphasis instead being placed upon illustrating the principles of the disclosure.

FIGS. 8A-D illustrate a layered manufacturing scheme including functionally graded porous substrates. FIG. 8E illustrates an exploded perspective view of a first, second, third, and forth porous substrates preforms after deposition to join the substrates together.

FIG. 5A is a plot of applied frequency to a working electrode in an electrochemical cell versus time. FIG. 5B is a plot of applied amplitude to a working electrode in an electrochemical cell versus time. FIG. 5C is a plot of applied current density to a working electrode in an electrochemical cell versus time. FIG. 5D is an envisioned resulting deposit composition map corresponding to the applied current density give in FIG. 5C (i.e., one frequency modulation cycle of deposition). FIG. 13E is an envisioned composition map corresponding to application of ten frequency modulation cycles of deposition.

FIGS. 15A-15C are illustrations of cross-sectional views of various embodiments of composite materials in accordance with the present disclosure. FIG. 15A is an illustration of a composite including an electrochemically infused particle bed having a particle distribution that gradually increases from the exterior surfaces of the composite into the center of the composite. FIGS. 15B and 15C are other illustrations of a composite including an electrochemically infused particle bed. In FIG. 15B, the particles have a repeating size distribution. In FIG. 15C, the particles have a graded distribution.

FIGS. 16A and 16B are illustrations of two separate embodiments of a compositionally modulated material disposed within the void structure between four particles.

FIG. 17 is an illustration of a cross-sectional view of an embodiment of a composite material including a nanostructured capping layer deposited on an exterior surface of a porous substrate.

DETAILED DESCRIPTION

Figure 1:
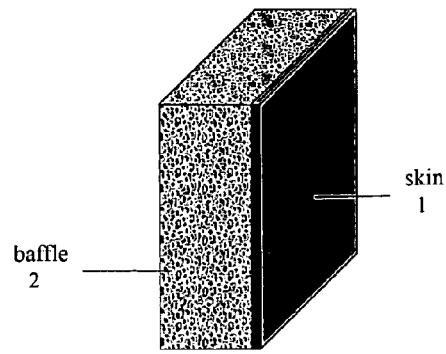
FIG. 1 is an illustration of a composite material in accordance with one embodiment of the present disclosure. This composite material includes an impermeable skin (i.e. liner) and a porous foam baffle (i.e., substrate).
Figure 2:
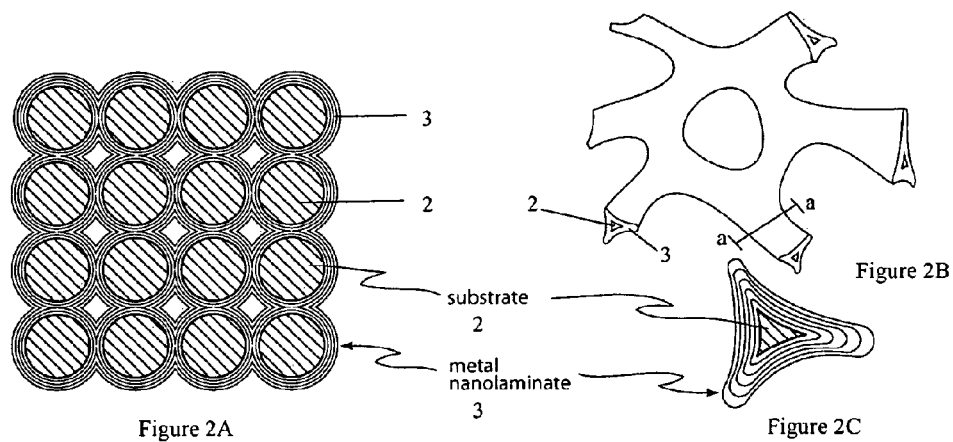
FIG. 2A is an cross-sectional illustration of an embodiment of a reinforcement material applied to a porous substrate. This embodiment includes a carbon fiber tow porous substrate reinforced with a metal nanolaminate coating.
FIG. 2B is an illustration of another embodiment of a reinforcement material applied to a porous substrate. This embodiment includes a reticulated foam porous substrate reinforced with a metal laminate coating.
FIG. 2C is an cross-sectional illustration taken along line a-a in FIG. 2B showing a portion of the foam substrate with reinforcement material.
Figure 3:
FIGS. 3A-3C are micrographs of a fracture surface of a metal nanolaminate deposited over a reticulated foam substrate, at a magnification of 24×, 100×, and 600×, respectively.

Referring to the drawings, FIG. 1 illustrates one embodiment of the proposed baffle/liner fuel tank material. The fuel tank material comprises a fully dense (e.g., about 95% dense, 96% dense, 97% dense, 98% dense, 99% dense, 100% dense), fluid-impermeable skin 1 and a porous metal baffle material 2, such as a foam or honeycomb. The skin 1 and metal baffle 2 may be combined via glue, weld or other metal adhesion process, or, in an embodiment, the skin 1 and baffle 2 may be a single monolithic system formed via electrodeposition or other suitable method. In one advantageous embodiment, and in contrast to the sharp transition between baffle 2 and skin 1 shown in FIG. 1, the open cellular structure of the baffle will transition gradually to a completely closed off, fully dense, fluid-impermeable skin at the face.

The tank material can include, in one embodiment, a reinforcing material 3, such as a nanolaminated metal material that can be produced by electrodeposition (electroplating) under controlled, time-varying conditions. These conditions include one or more of the following: applied current, applied voltage, rate of agitation, and concentration of one or more of the species within the electroplating bath (e.g., a bath including one or more of an electrodepositable species such as nickel, iron, copper, cobalt, gold, silver, zinc, or platinum). Nanolaminations are defined here as spatial modulations, in the growth direction of the electrodeposited reinforcing material, in structure (e.g. crystal size, orientation, type), composition (e.g. alloy composition), or both. Nanolaminates include a modulation wavelength that is less than 1 micron—i.e., the modulation wavelength is nanoscale. (See International Patent Publication No. WO2007021980 for a further description of nanolaminate materials and electrodeposition of nanolaminate materials.) Metal nanolaminates can be applied over a variety of porous preforms such as honeycombs, fiber cloth or batting (woven or nonwoven), and reticulated foams (see FIGS. 2B, 2C, 3A, 3B, and 3C), most of which possess little structural integrity in their original form, and can therefore be easily shaped to the desired tank or component geometry prior to electrodeposition. In addition, metal nanolaminates can be deposited throughout a porous preform formed of an unconsolidated material (e.g., a bed of power or beads). Metal laminates can be deposited into the open, accessible interior void structure of a porous preform, as well as on an exterior surface of any preform. Furthermore, plating conditions can be controlled to effect both uniform nanolaminate growth throughout the preform, as well as preferential growth and densification near the external surface of the preform. That is, deposition of the nanolaminate material can be controlled such that the nanolaminates thickness increases throughout the preform (or at least a portion of the preform). In this fashion, both baffle and skin can be produced in a single production run, without removing the part from the plating tank.

Figure 4:
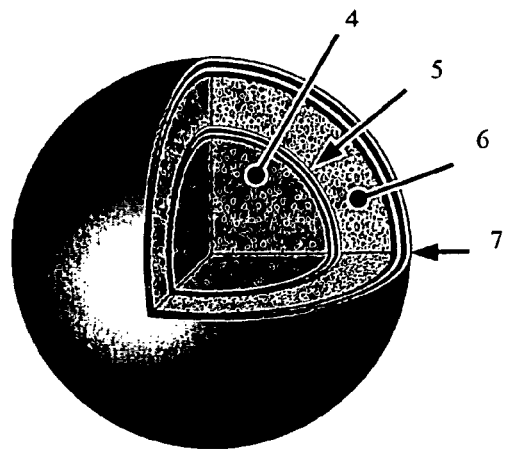
FIG. 4 is an illustration of an embodiment of a fuel tank in accordance with one embodiment of the present disclosure.

FIG. 4 illustrates an example of a spherical fuel tank (fueling port not shown) with enhanced structural integrity and ballistic resistance. Note that the shape of the tank can be tailored for specific fit requirements. The shape of the fuel tank is shown in FIG. 4 as spherical for conceptual depiction only. An internal portion 4 of the fuel tank may be filled with an accessible porous reinforcing material such as foam or honeycomb, or may be left open. The interior portion 4 (shown in FIG. 4 as a metal foam) holds the fuel. In this embodiment, the interior portion 4 is made of at least 0.5% metal foam by volume. The porous interior portion 4 provides a wicking action which regulates fuel withdrawal, reduces spillage and explosion in case of breach. In addition the porous interior portion 4, provides structural support to the fuel tank. A fuel shell 5 formed of a fluid-impermeable material and located at the exterior surface of the interior portion 4 serves to prevent leakage of fuel from the interior portion as well as to provide secondary strike protection (e.g., puncture resistance). The exterior foam layer 6 absorbs and distributes force of an impact to protect the interior portion 4 and the external shell 7 serves to provide principal strike protection.

Figure 5:
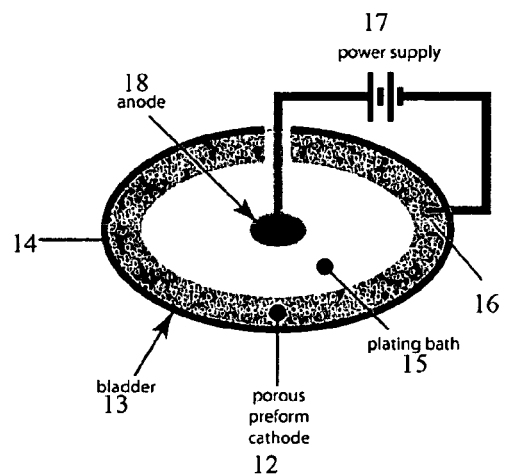
FIG. 5 is an illustration of a method of producing a fuel tank in accordance with one embodiment of the present disclosure. The method uses a conformal bladder bound to a porous preform baffle.

The fuel tank material may be produced as shown in FIG. 5 by adhering or laying a conductive porous preform 12 in contact with the inside surface of a conductive or non-conductive fuel tank bladder 13 to form a cathode 16. The bladder 13 is then filled with electrolyte bath 15 containing one or more electrodepositable materials. Next, a power supply 17 is connected to the porous preform 12 and another to an electrode (i.e., anode 18) positioned within the composite shell 14 defined by the bladder 13 and reinforcing foam 12. Power is applied to these electrodes 16, 18 such that the nanolaminated metal (or other electrodepositable material) forms on the surface of the porous preform 12. After the desired metal thickness is achieved, the preform may be melted or etched away, or it may be left in place.

Figure 6:
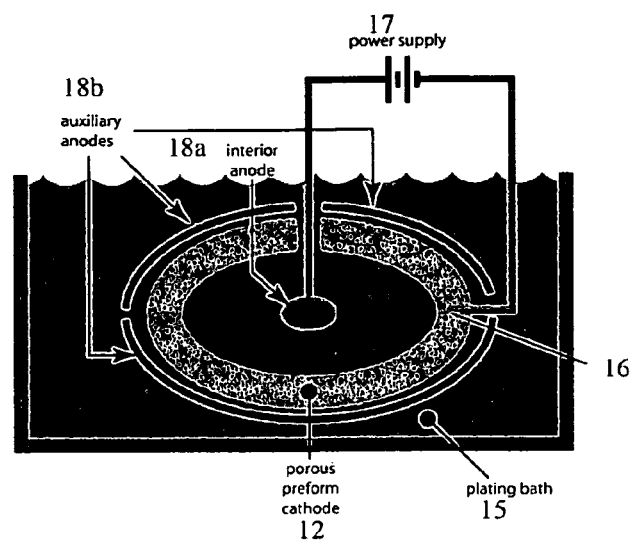
FIG. 6 is an illustration of another method of producing a fuel tank in accordance with one embodiment of the present disclosure.
Figure 7:
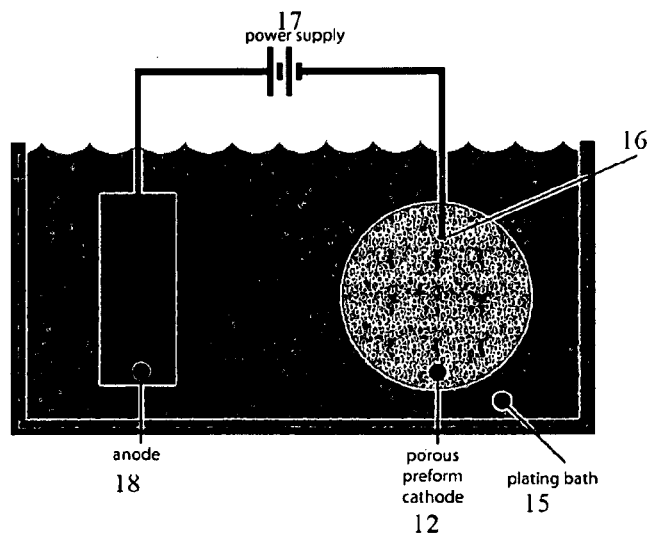
FIG. 7 is an illustration of another method of producing a fuel tank.

As shown in FIG. 6 and FIG. 7, the material may also be produced by immersing a conductive porous preform 12 into an electrolyte bath 15 containing at least one electrodepositable material. The conductive porous perform 12 also serves as the cathode 16 in these electrochemical cells. Next, a power supply 17 is connected to the preform 12 and another to one or more electrodes 18 immersed in the electrolyte bath 15. In the embodiment illustrated in FIG. 6, the electrochemical cell includes an interior anode 18a and two auxiliary anodes 18b which conform to the exterior of the preform 12 to impart the desired electrodeposit onto the porous (in this embodiment, hollow) preform 12. Power is applied to these electrodes 16, 18 such that the metal (or other electrodepositable material) forms on the accessible surface of the preform. After the desired metal thickness is achieved, the preform 12 may be melted or etched away, or it may be left in place.

FIGS. 8A-D depicts a layered manufacturing scheme, which allows functional gradation of the porous preform in three dimensions. In FIG. 8A, a metal laminate is deposited over the accessible surface (i.e., exterior and accessible interior void structure) of a single layer of a functionally graded porous preform. The functionally graded porous preform shown in FIG. 8A is a radially graded pores per inch (PPI) foam. In FIG. 8B, a second functionally graded porous preform layer is stacked on the metal laminate coated first layer and deposition of metal laminate continues over the entire preform to fuse the first and second radially graded layers together. In FIG. 8C a third functionally graded porous preform is added and a metal laminate is deposited to join the first, second and third graded porous preforms together. In FIG. 8D a fourth porous preform is added and a nanolaminate is deposited to fuse the first, second, third and forth preforms together. FIG. 8E illustrates an exploded view of the first, second, third, and forth preforms (i.e., layers) after deposition. Advantages of this technique include reduced preform waste, more thorough control of deposit uniformity through the bulk (since the bulk comprises several stacked, sequentially plated thin layers), and the ability to control the spatial distribution of porous preform material as well as nanolaminated metal reinforcing material.

An advantageous embodiment of the present invention features a composite material with a corrosion-resistant protective alloy covering atop a nanolaminated reinforcement. The corrosion-resistant protective alloy can also be positioned at other locations (besides atop) throughout the nanolaminated reinforcement. One such protective alloy consists of 70% Ni and 30% Cu. Other electrodepositable metals and/or polymers and/or particles could be used to achieve specific material properties as desired.

Methods and Materials

In some embodiments, the coatings (e.g., fuel shell and exterior shell) as well as the foam/porous layers of the fuel tank can be formed utilizing electrodeposition techniques. In addition, in some embodiments, both the coatings and/or the foam layers can include compositionally modulated electrodeposited materials, such as, for example, nanolaminate coatings. Some exemplary electrodeposition techniques and materials are provided within this section entitled "Methods and Materials." These techniques and materials are not meant to be exhaustive, but rather are merely illustrative of possible embodiments of the technology disclosed herein.

The term "compositionally modulated" describes a material in which the chemical composition varies throughout at least one spatial coordinate, such as, for example, the material's depth. For example, in an electrochemical bath including a nickel-containing solution and an iron-containing solution, the resulting compositionally modulated electrodeposited material 20 includes alloys having a chemical make-up according to $Ni_xFe_{1-x}$, where x is a function of applied current or voltage and mass flow of the bath solution. Thus, by controlling or modulating at least one of the mass flow of the bath solution or the applied current or voltage to electrodes, the chemical make-up of a deposited layer can be controlled and varied through its depth (i.e., growth direction). As a result, the compositionally modulated electrodeposited material 20 shown in FIG. 9 includes several different alloys as illustrated by layers 30, 32, 34, 36, and 38.

Figure 9:
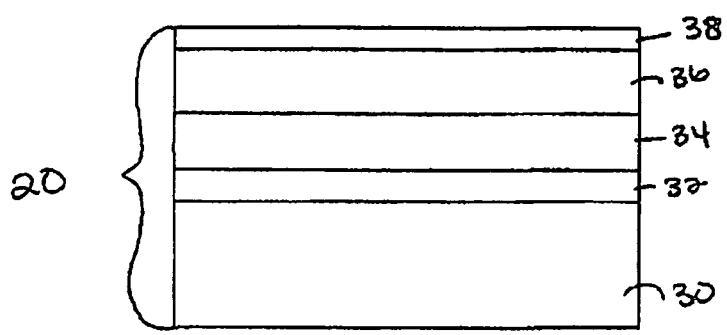
FIG. 9 is an illustration of an enlarged cross-sectional view of a compositionally modulated electrodeposited material in accordance with another embodiment of the present disclosure.

Referring to FIG. 9, layers 32 and 36 represent nickel-rich (x>0.5) deposits, whereas layers 30, 34, and 38 represent iron-rich (x<0.5) deposits. While layers 32 and 36 are both nickel rich deposits, the value for x in each of layers 32 and 36 need not be the same. For example, the x value in layer 32 may be 0.7 whereas the x value in layer 36 may be 0.6. Likewise, the x values in layers 30, 34, and 38 can also vary or remain constant. In addition to the composition of the constituents (e.g., Ni and Fe) varying through the depth of the electrodeposited material 20, a thickness of each of the layers 30 to 38 varies through the depth as well. FIG. 9, while not to scale, illustrates the change or modulation in thickness through the layers 30, 32, 34, 36, and 38.

Figure 10:
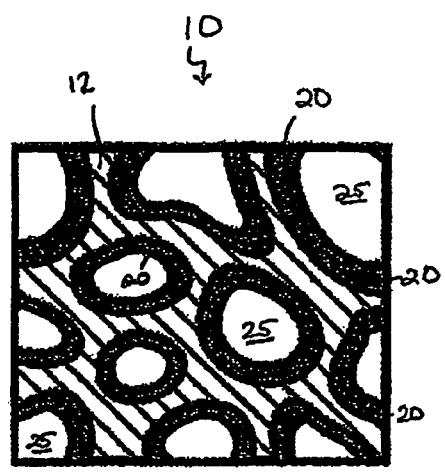
FIG. 10 is an illustration of an enlarged cross-sectional view of a composite material in accordance with one embodiment of the present disclosure. This composite material includes a consolidated porous substrate with a compositionally modulated electrodeposited material disposed in at least a portion of an open, accessible void structure of the porous substrate.

FIG. 10 illustrates another embodiment of the composite material, shown here as composite material 10. In this embodiment, a porous substrate 12 is a consolidated porous body. That is, the porous substrate 12 in this embodiment is a unitary piece that includes a plurality of voids 25 that define an accessible, interior void structure. Examples of consolidated porous bodies include, foams, fabrics, meshes, and partially sintered compacts. The compositionally modulated material 20 is electrodeposited throughout the accessible, interior void structure to form a coating along the walls of the substrate 12 defining the voids 25.

Figure 11:
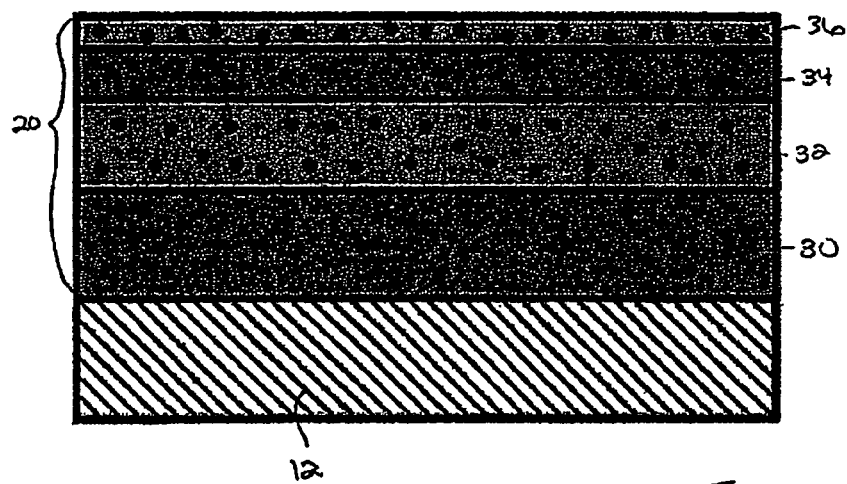
FIG. 11 is an illustration of a cross-sectional view of the compositionally modulated material of FIG. 10 along one of the voids.

Referring to FIG. 11, the compositionally modulated material 20 disposed within the plurality of voids 25 (as shown in FIG. 10) includes multiple alloys illustrated as distinct layers 30, 32, 34, and 36. As described above the compositionally modulated material 20 is varied in both constituent concentration (i.e., to form the different alloy layers making up the material 20) and in thickness of the layers. In the embodiment shown in FIG. 11, the nickel-rich layers 32 and 36 further include a concentration of particles disposed therein, thereby forming particle-reinforced composite layers. As shown in FIG. 11, layers 32 and 36 need not include the same concentration of particles, thereby allowing the compositionally modulated material 20 to be further tailored to provide optimal material properties. While not wishing to be bound by any particular theory, it is believed that increasing the concentration of the particles in a layer increases the hardness of that particular layer. The concentration of particles per layer can be controlled through modulating the flow rate of the bath during electrodeposition. The particles can have any shape, such as spherical particles, pyramidal particles, rectangular particles, or irregularly shaped particles. In addition, the particles can be of any length scale, such as for example, millimeter sized (e.g., 1 to 5 millimeter), micron-sized (e.g., 100 microns to 0.1 microns), nanometer sized (e.g., 100 nm to 1 nm). In some embodiments, 85% or more (e.g., 87%, 89%, 90%, 93%, 95%, 96%, 97%, 98%, 99%, 100%) of the nanosized particles have an average grain size within a range of 10 nm to 100 nm. In certain embodiments, 85% or more of the nanosized particles have an average grain size within a range of 20 nm to 50 nm, 30 nm to 50 nm, 10 nm to 30 nm, or 1 to 10 nm. Examples of some suitable particles include carbide particles, alumina particles, glass particles, polymer particles, silicon carbide fibers, and clay platelets.

Figure 12:
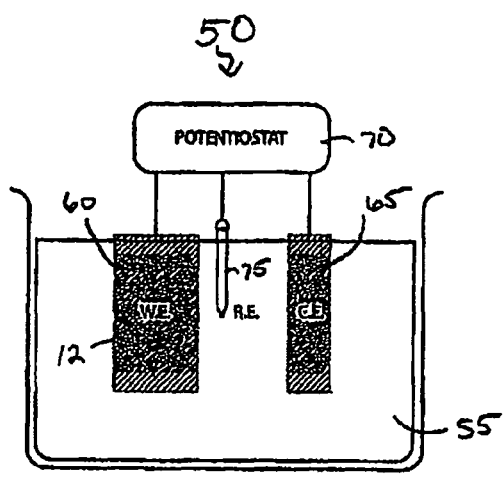
FIG. 12 is an illustration of an electroplating cell including a working electrode attached to the porous substrate.

To form or deposit the compositionally modulated electrodeposited material 20, the porous substrate 12 is submerged into an electrochemical cell. Referring to FIG. 12, an electrodeposition cell 50, in one embodiment, includes a bath 55 of two or more of metal salts, a cathode (i.e., working electrode) 60, an anode (i.e., a counter electrode) 65, and a power supply (e.g. a potentiostat) 70, which electrically connects and controls the applied current between the working and counter electrodes, 60 and 65, respectively. The cell 50 can also include a reference electrode 75 to aid the potentiostat 70 in accurately controlling the applied current by providing a reference base line current measurement. In general, when an electrical current is passed through the cell 50, an oxidation/reduction reaction involving the metal ions in the bath 55 occurs and the resulting product is deposited on the working electrode 60. As shown in FIG. 12, the porous substrate 12 is positioned in contact with the working electrode 60. For example, in certain embodiments, the porous substrate is formed of a conductive material and functions as an extension of the working electrode 60. As a result, the resulting product of the oxidation/reduction reaction deposits within the accessible interior void structure 25. In other embodiments, the porous substrate 12 is formed of a nonconductive material and thus, electrodeposition occurs at a junction between the working electrode 60 and the porous substrate 12.

In general, one of the advantages of the methods and resulting composite materials described in this disclosure is a wide range of choices of materials available for deposition into the interior void structure 25 of the porous substrate 12. For example, salts of any transition metal can be used to form the bath 55. Specifically, some preferred materials include salts of the following metals: nickel, iron, copper, cobalt, gold, silver, zinc, and platinum. In addition to the wide range of materials available, electrodeposition techniques have an additional advantage of easily modifiable processing conditions. For example, a ratio of the metal salts and other electrodepositable components, such as, for example, alumina particles, can be controlled by their concentration within the bath. Thus, it is possible to provide a bath that has a Ni:Fe ratio of 1:1, 2:1, 3:1, 5:1, 10:1 or 20:1 by increasing or decreasing the concentration of a Fe salt within the bath in comparison to the Ni salt prior to deposition. Such ratios can thus be achieved for any of the electrodepositable components. Where more than two electrodepositable components are provided, such ratios can be achieved as between any two of the components such that the overall ratios for all components will be that which is desired. For example, a bath with Ni, Fe and Cu salts could yield ratios of Ni:Fe of 1:2 and a Ni:Cu of 1:3, making the overall ratio of Ni:Fe:Cu 1:2:3. In addition, a bath with Ni salt and alumina particles could yield a ratio of Ni:Al$_2$O$_3$ of 2:1, 2:1, 1:2, 3:1 or 1:3 by increasing or decreasing the concentration of particles within the bath.

Figure 13A:
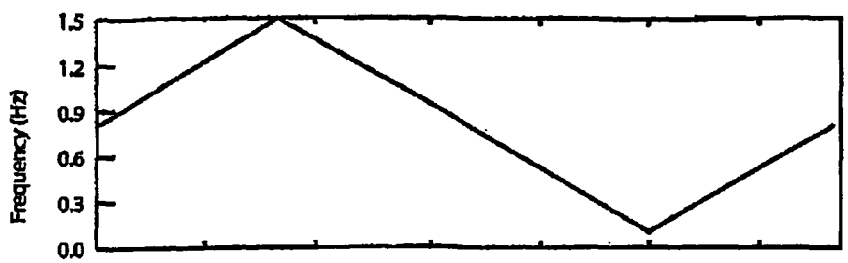
FIGS. 13A, 13B, 13C, 13D and 13E are graphs showing electrodeposition conditions and resulting composition maps for the deposition conditions.
Figure 13B:
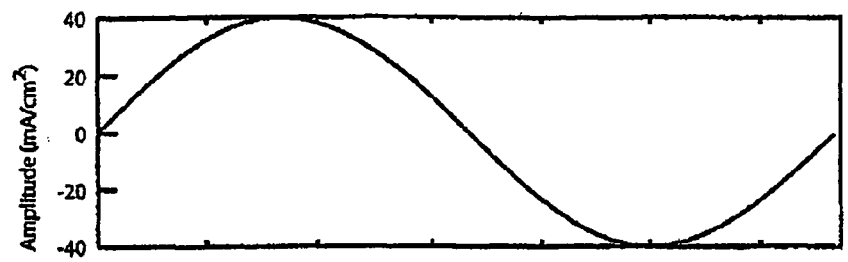
Figure 13C:
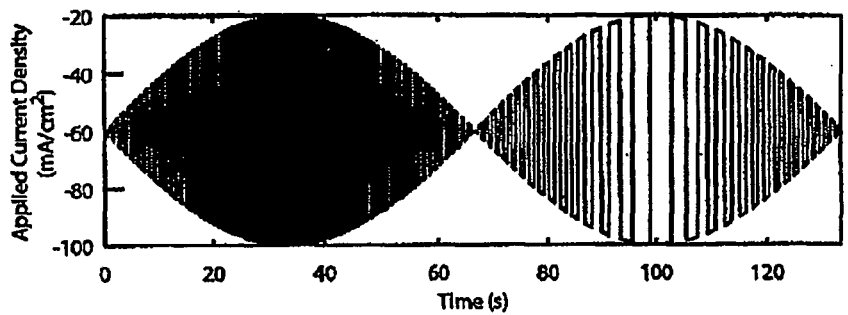
Figure 13D:
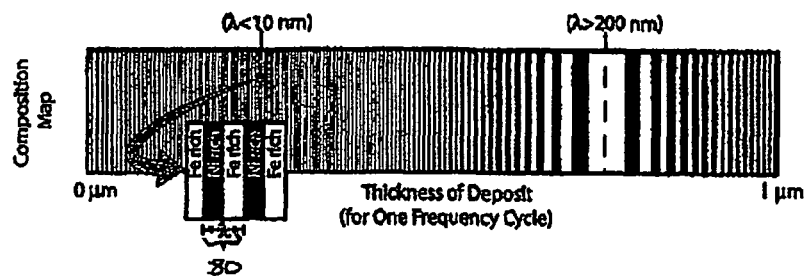

FIGS. 13A, 13B, and 13C illustrate applied conditions to the electrochemical cell 50 for depositing the compositionally modulated material 20. FIG. 13D illustrates a resulting composition map for the applied conditions shown in FIGS. 13A, 13B, and 13C. FIG. 13C shows the current density over a period of 130 seconds applied to the working electrode 60. The applied current drives the oxidation/reduction reaction at the electrode to deposit a material product having the form $A_xB_{1-x}$, where A is a first bath constituent and B is a second bath constituent. While FIG. 13C illustrates a current density range of between −20 to −100 mA/cm$^2$, other current density ranges are also possible for example, a current density range of between about −5 to −20 mA/cm$^2$ may be preferable in some embodiments.

Another way of defining the modulation of the compositions of the deposited alloys ($A_xB_{1-x}$, where x varies) is with respect to a composition cycle. A composition cycle 80 defines the deposition of a pair of layers. The first layer of the composition cycles is a A-rich and the second layer is B-rich. Each composition cycle has a wavelength. A value assigned to the wavelength is equal to the thickness of the two layers forming the composition cycle 80. That is, the wavelength has a value that is equal to two times the thickness of one of the two layers forming the composition cycle (e.g., λ=10 nm, when thickness of Ni-rich layer within the composition cycle is equal to 5 nm). By including one or more composition cycles the deposited material is compositionally modulating. In a preferred embodiment, the compositionally modulated electrodeposited material 20 includes multiple composition cycles 20 (e.g., 5 composition cycles, 10 composition cycles, 20 composition cycles, 50 composition cycles, 100 composition cycles, 1,000 composition cycles, 10,000 composition cycles, 100,000 composition cycles or more).

The applied current density as shown in FIG. 13C is determined from an applied variation in frequency of the current per time (FIG. 13A) in combination with an applied variation in amplitude of the current per time (FIG. 13B). Referring to FIG. 13A, an applied frequency modulation, shown here as a triangle wave, effects the wavelength of the composition cycles. As shown by comparing FIGS. 13A and 13D, the wavelength of the composition cycles decreases as the frequency increases. While FIG. 13A illustrates this effect with an applied triangle wave, any waveform (i.e., a value that changes with time) may be applied to control or modulate the frequency and thus control or modulate the thickness/wavelengths of the deposited material 20. Examples of other waveforms that may be applied to tailor the changing thickness/wavelength of each of the deposited layers/composition cycles include sine waves, square waves, sawtooth waves, and any combination of these waveforms. The composition of the deposit (i.e., x value) can also be further modulated by varying the amplitude. FIG. 13B illustrates a sine wave modulation of the applied amplitude of the current applied to the working electrode. By changing the amplitude over time, the value of x varies over time such that not all of the Ni-rich layers have the same composition (nor do all the Fe-rich layers have the same composition).

Figure 14A:
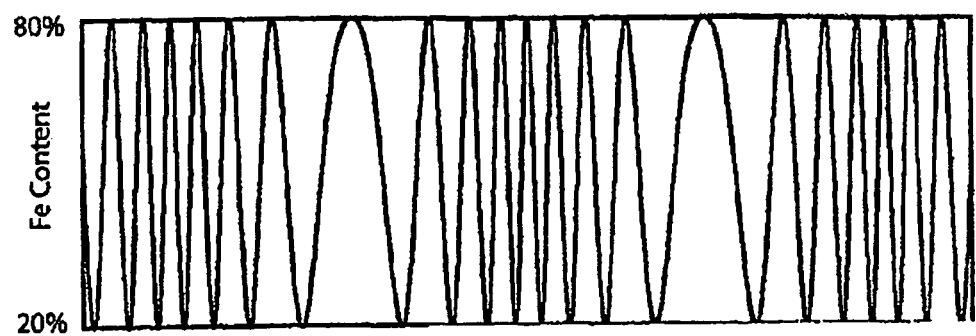
FIG. 14A is a graph showing a waveform of iron content in a nickel-iron compositionally modulated electrodeposited coating and FIG. 14B is the corresponding composition map.
Figure 14B:
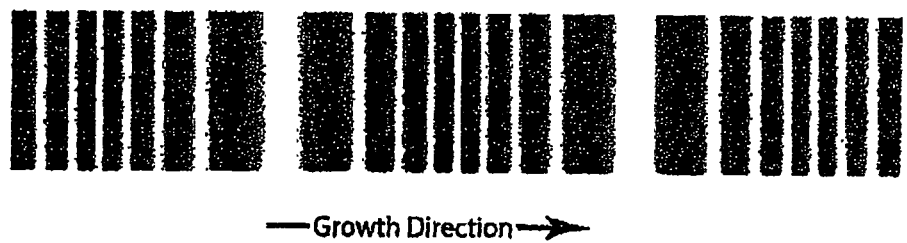

Referring to FIGS. 14A and 14B, in some embodiments, the value of x is modulated within each of the layers, such that the compositionally modulated electrodeposited material 20 is graded to minimize or mask composition discontinuities. As a result of applying one or more of the above deposition conditions, the compositionally modulated electrodeposited material 20 can be tailored to include layers that provide a wide range of material properties and enhancements. One such enhancement is an increase in hardness. Without wishing to be bound to any particular theory, it is believed that regions of nanolaminate material (i.e., regions in which all of the composition cycles have a wavelength less than about 200 nm and preferably less than about 80 nm) exhibit a superior hardness not achievable by the same materials at greater lengths scales. This superior hardness is believed to arise from an increase in the material's elastic modulus coefficient, and is known as the "supermodulus effect." In certain embodiments, the compositionally modulated electrodeposited material 20 is deposited to include one or more regions, which provide the composite material 10 with the supermodulus effect. That is, the compositionally modulated electrodeposited material 20 disposed within the void structure 25 of the porous substrate 12 or on an exterior surface of a substrate includes one or more regions in which all of the composition cycles include wavelengths less than 200 nm, and preferably less than about 80 nm. In one embodiment, the wavelengths are less than about 70 nm. In another embodiment, the hardness of the composite material 10 is enhanced by including varying concentrations of particles (e.g., $Al_2O_3$, SiC, $Si_3N_4$) within an electrodeposited metal. For example, by increasing the concentration of $Al_2O_3$ particles dispersed within layers of an electrodeposited Ni metal, an increase in Vicker's Hardness from 240 VHN to 440 VHN is achievable.

In some embodiments, the compositionally modulated electrodeposited material 20 can include regions in which the composition cycles 80 include wavelengths less than 200 nm (and thus which may exhibit the supermodulus effect) and also include regions in which some portion (e.g., at least or about: 1%, 2%, 5%, 7%, 10%, 20%, 30%, 40%, 50%, 60%, 70%, 80%, 90%, 92% 95%, 97%, 99% and 100%) of the composition cycles 80 include wavelengths greater than 200 nm. The portion(s) of the composition cycles 80 that include wavelengths greater than 200 nm could also be represented in ranges. For example, the composition cycles 80 of one or more regions could include a number of wavelengths greater than 200 nm in a range of from 1-2%, 2-5%, 1-5%, 5-7%, 5-10%, 1-10%, 10-20%, 20-30%, 30-40%, 40-50%, 50-60%, 60-70%, 70-80%, 80-90%, 90-92%, 90-95%, 95-97%, 95-99%, 95-100%, 90-100%, 80-100%, etc., with the balance of the composition cycles being less than 200 nm in that region. Without wishing to be bound by any particular theory, it is believed that, as hardness increases, ductility decreases. As a result, in order to provide a composite material that is enhanced to include regions of increased hardness and regions of increased ductility, the compositionally modulated electrodeposited material 20, in some embodiments, can include one or more regions in which all of the composition cycles 80 have a wavelength of about 200 nm or less including wavelengths less than 1 nanometer, one or more regions in which all of the composition cycles have a wavelength greater than 200 nm, and/or one or more regions in which a portion of the composition cycles 80 have a wavelength of about 200 nm or less and a portion have a wavelength greater than 200 nm. Within each of those portions, the wavelengths also can be adjusted to be of a desired size or range of sizes. Thus, for example, the region(s) having composition cycles of a wavelength of about 200 nm or less can themselves have wavelengths that vary from region to region or even within a region. Thus, is some embodiments, one region may have composition cycles having a wavelength of from 80-150 nm and another region in which the wavelengths are less than 80 nm. In other embodiments, one region could have both composition cycles of from 80-150 nm and less than 80 nm.

In certain embodiments, the compositionally modulated material 20 is tailored to minimize (e.g., prevent) delamination of its layers during use. For example, it is believed that when a projectile impacts a conventional laminated material, the resulting stress waves may cause delamination or debonding due to the presence of discontinuities. However, the compositionally modulated electrodeposited material 20 described herein can include a substantially continuous modulation of both its composition (i.e., x value) and wavelength such that discontinuities are minimized or eliminated, thereby preventing delamination.

Referring to FIGS. 15A-15C, in addition to compositionally modulating the electrodeposited material 20 to form the composite 10, the porous substrate material 12 can also be made of a material that is modulated through its depth. For example, as shown in FIG. 15A, in one embodiment, the porous substrate 12 is formed of particles 15 that gradually increase in size from an exterior 100 of the compact to an interior 110 of the composite 10. The particles in such embodiments can range from, e.g., 5 nm on the exterior 100 to 50 microns in the interior 110, 5 nm on the exterior 100 to 10 microns in the interior 110, 5 nm on the exterior to 1 micron in the interior 110, 10 nm on the exterior 100 to 10 microns in the interior 110, or from 10 nm on the exterior 100 to 1 micron in the interior. The differently sized particles 15 contribute to the material properties of the composite 10. For example, smaller particles have a greater surface area energy per unit volume than larger particles of the same material. As a result, the porous substrate can be tailored to provide additional advantageous material properties to different regions of the composite 10. Referring to FIGS. 15B and 15C, the porous substrate 12 can have other particle arrangements to provide different material properties to the composite 10. For example, in FIG. 15B the particles have a repetitive size distribution and in FIG. 15C the particles have a graded distribution.

FIGS. 16A and 16B show an enlarged cross-sectional view of the compositionally modulated electrodeposited material 20 disposed between four adjacent particles 15 of a porous substrate 12. In FIG. 16A, the particles 15 forming the porous substrate 12 are non-conductive particles (e.g., alumina particles, glass particles). As a result of their non-conductivity, electrodeposition occurs between two electrodes disposed on either end of the porous substrate 12 and the compositionally modulated electrodeposited material 20 is deposited in a bottom-up fashion. Thus, the compositionally modulated electrodeposited material fills the entire void structure 25 between the four particles. In the embodiment shown in FIG. 16B, the particles 15 are electrically conductive. As a result, electrodeposition can occur within the conductive porous material to produce layers that are initiated at a particle/void interface 120 and grow inwards to fill at least a portion of the interior void structure 25.

In addition to electrodepositing into a porous preform, the compositionally modulated material 20 can also be deposited on the exterior surfaces 100 of the porous substrate 12 to form a nanolaminate coating (e.g., a fuel shell or an exterior shell for a fuel tank as shown in FIG. 4). For example, after the accessible interior void structure 25 is at least partially filled in the case of an electrically conductive porous substrate or substantially filled in the case of a non-conductive porous substrate, an additional or capping layer 150 can be deposited onto the substrate to seal off the interior porous structure 25 as shown in FIG. 17.

Figure 18:
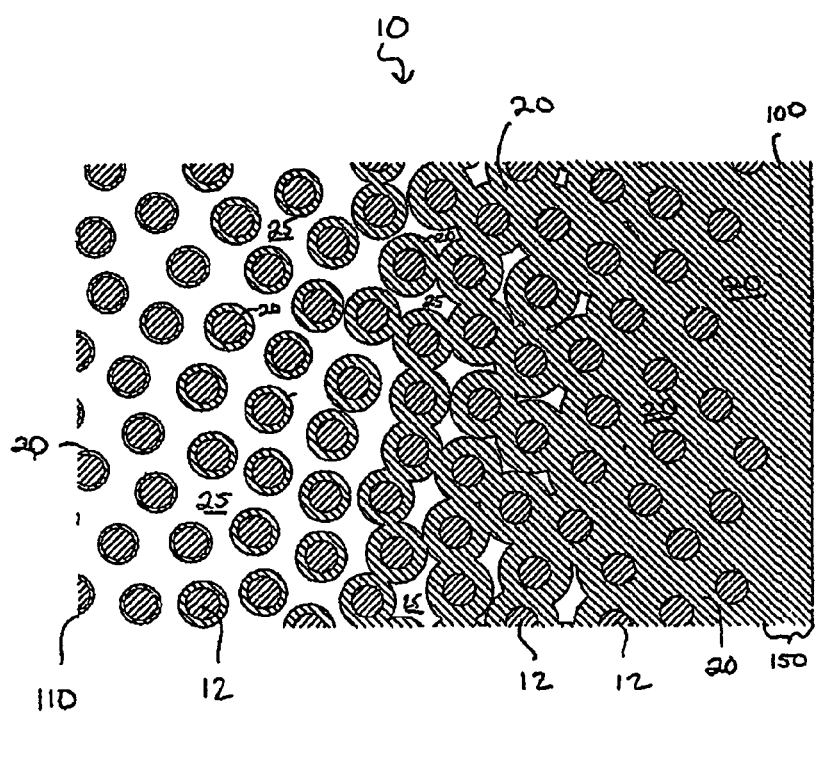
FIG. 18 is an illustration of a cross-sectional view of an embodiment of a consolidated, conductive porous substrate with a tailored filing of a compositionally modulated electrodeposit coating disposed within its accessible void structure. Deposition conditions for this embodiment have been tailored to not only vary a thickness of the coating throughout the depth of the consolidated conductive porous substrate, but also to cap or seal the composite with a dense compositionally modulated layer that substantially closes off accessibility to the interior void structure.

In certain embodiments, the filling of the accessible interior void structure 25 is tailored such that the thickness of the compositionally modulating electrodeposited material 20 varies throughout the composite 10. For example, FIG. 18 illustrates a composite material 10 formed of a porous conductive foam 12 and a $Ni_xFe_{1-x}$ compositionally modulated material 20. The thickness of the compositionally modulated material 20 continuously increases (i.e., thickens) from the interior portion 110 of the porous substrate 12 to the exterior 100. To create this thickening, the current density during deposition is continuously increased. In addition to including the compositionally modulated material 20 disposed throughout the void structure 25 of the substrate 12, a dense layer of the compositionally modulated material, referred to as the capping layer 150 is further applied to the exterior 100 of the substrate 12 to close off the accessible pore structure 25.

Methods of forming the composite 10 using electrodeposition can include the following steps: (1) forming a bath including at least two electrodepositable components, (2) connecting the porous preform 12 to the working electrode 60, (3) inserting the porous preform 12, the working electrode 60, and the counter electrode 65 into the bath 55, and (4) applying a voltage or current to the working electrode 60 to drive electrodeposition.

Figure 13E:
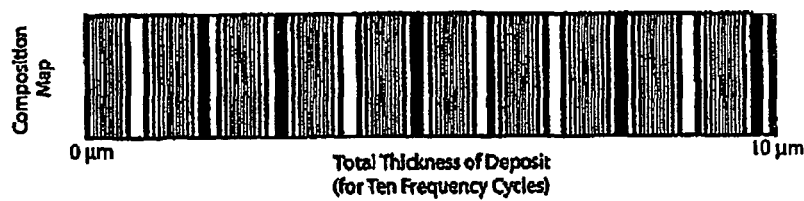

In general, in one embodiment, the voltage or current applied to the working electrode 60 varies over time so that the compositionally modulated material is electrodeposited into the voids 25 of the porous substrate 12. Thus, in some embodiments, the voltage or current is applied to the electrode 60 with a time varying frequency that oscillates in accordance with a triangle wave. In other embodiments, the voltage or current is applied to the electrode with a time varying frequency that oscillates in accordance with a sine wave, a square wave, a saw-tooth wave, or any other waveform, such as a combination of the foregoing waveforms. The voltage or current can be applied for one waveform cycle as shown in FIG. 13A, or preferably for two or more cycles (e.g., three cycles, five cycles, 10 cycles, 20 cycles). FIG. 13E shows the envisioned composition map for a 10 cycle deposit.

In addition to controlling the voltage or current, other deposition conditions can also be monitored and varied to tailor the compositionally modulating material 20. For example, it is believed that the pH of the bath has an effect on upon the quality of the deposited material. Thus, in some embodiments, the pH of the bath is controlled during electrodeposition. For example, prior to deposition a pH set point (e.g., a pH of 1, 2, 3, 4, 5, 6, 7, 8, 9, 10, 11, 12, 13 or 14) or range (e.g., a pH of 1-2, 2-3, 3-4, 5-6, 6-7, 7-8, 8-9, 9-10, 10-11, 11-12, 12-13, or 13-14) is determined. During electrodeposition, the pH of the bath is monitored and if a difference from the set point is determined, pH altering chemicals, such as, for example, HCl or NaOH, are added to the bath to return the bath to its pH set point.

The concentration of the electrodepositable components in the bath can also be monitored and controlled. For example, concentration sensors can be positioned within the cell 50 to monitor the concentrations of the metal salts as well as any depositable particles within the bath. During electrodeposition of the compositionally modulated material 20, the concentrations of the depositable components (e.g., metal salts, particles) can become depleted or at least decreased from a predetermined optimal level within the bath. As a result, the timeliness of the deposition of the compositionally modulated material 20 can be effected. Thus, by monitoring and replenishing the concentrations of the depositable components electrodeposition can be optimized.

In certain embodiments, flow rate of the bath can be modulated or varied. As described above, both the applied current or voltage and the mass flow rate of the depositable components effects the x-value of the electrodeposit (e.g., $Ni_xFe_{1-x}$). Thus, in some embodiments, the flow rate of the bath containing the depositable components is varied in addition to the applied voltage or current to produce the modulation in the value of x. In other embodiments, the applied voltage or current remains constant and the flow rate is varied to produce the modulation in the value of x. The flow rate of the bath can be increased or decreased by providing agitation, such as, for example, a magnetically-controlled mixer or by adding a pump to the cell 50. By agitating the bath or by agitating the perform the mass transfer rate of the electrodeposited material is effected in that electrodepositable species may be more readily available for deposition thereby providing improved deposition conditions.

Figure 19:
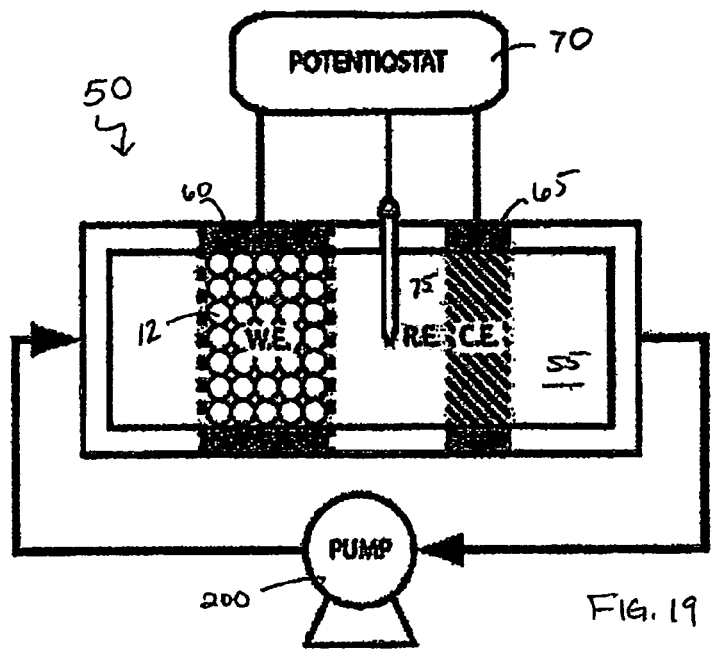
FIG. 19 is an illustration of a flow cell for electrodepositing a compositionally modulated material into a void structure of an electrically conductive porous substrate.
Figure 20:
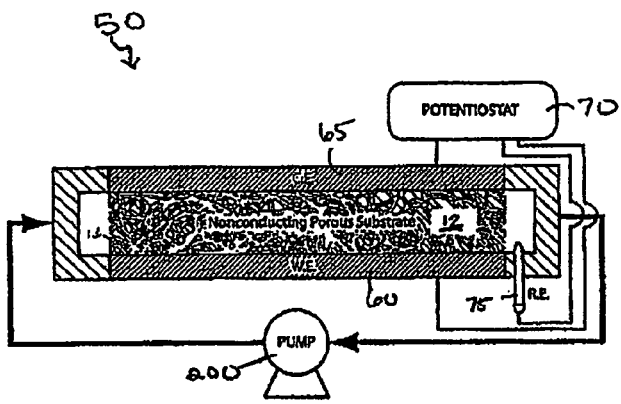
FIG. 20 is an illustration of a flow cell for electrodepositing a compositionally modulated material into a void structure of an electrically non-conductive porous substrate.

FIGS. 19 and 20 illustrate embodiments of an electrochemical cell 50 that includes a pump 200. In general, these cells 50 are referred to as flow cells because they force a bath solution through a porous substrate. Referring to FIG. 19, the flow cell includes a porous working electrode 60, which is also the porous electrically-conductive substrate 12, and a porous counter electrode 65. The working electrode 60, the counter electrode 65 and the reference electrode 75 are in communication and are controlled by the potentiostat 70. The bath fluid 55 including the depositable components is forced through the porous working electrode 60 (and thus the porous substrate 12) and the counter electrode 65 at a flow rate adjustable at the pump 200. Thus, in certain embodiments, the flow rate of the pump 200 can be controlled in accordance with a triangle wave, square wave, sine wave, a saw tooth wave, or any other waveform, such that the flow rate can be modulated to produce the compositionally modulated material 20. FIG. 20 illustrates another embodiment of a flow cell 50 for use with non-conductive porous substrates 12. In this cell 50, the working electrode 60 and the counter electrode 65 are disposed within a wall of the cell 50 and the bath fluid 55 is forced through the porous non-conductive substrate 12. Electrodeposition occurs in a bottom-up fashion, that is, the deposition of material 20 proceeds from the working electrode 60 to the counter electrode 65 substantially filling the void structure 25 along the way.

The methods and composite materials described herein can be tailored to provide the unusual combination of strength, ductility, and low-density. For example, the porous substrate 12 forming the matrix of the composite material 10 can be formed of a light-weight ceramic material or can include a relatively large amount (e.g., 40% by volume, 50% by volume, 60% by volume) of accessible interior void space 25. The compositionally modulated material 20 electrodeposited into the accessible, interior void space 25 can be tailored to provide strength at least in part through nanolaminate regions and ductility at least in part through micron or submicron sized laminated regions. These composite materials can be utilized in automotive applications, ballistic applications, or any other application that would benefit from this combination of material properties.

EXAMPLES

The following examples are provided to further illustrate and to facilitate the understanding of the disclosure. These specific examples are intended to be illustrative of the disclosure and are not intended to be limiting.

Example 1

A fuel tank for a vehicle can be formed to have an interior portion made from a preform of reticulated vitreous carbon, a fuel shell made of a nanolaminate coating including Ni and Fe, an exterior foam or porous layer formed of a conductive fabric, and an exterior shell including a Ni/Fe nanolaminate coating (which can either be identical to the fuel shell layer or have a different composition and/or structure than the fuel shell layer). Both the fuel shell and exterior shell nanolaminate coatings are formed by means of electrodeposition.

To form the fuel tank, a bath including 0.2M $Ni(NH_2SO_3)_2 \bullet 4H_2O$, 0.2M $FeCl_2 \bullet 4H_2O$, 0.40M $H_3BO_3$, 1.5 g/L sodium saccharin, 0.2 g/L sodium dodecyl sulfate, 1.0 g/L ascorbic acid, and enough sulfamic acid or nickel carbonate to attain a pH level of 3.00±0.01 is prepared. Anodes formed of titanium baskets including nickel S-rounds are obtained. The baskets are selected such that a nominal basket area is equal to or greater than a nominal workpiece area (i.e., the workpiece is the preform of reticulated vitreous carbon to be coated with nanolaminate). The baskets are positioned within the bath to optimize the uniformity of a current distribution over the workpiece.

The workpiece, which includes a 20 pores per inch reticulated vitreous carbon preform formed into a particular tank geometry (e.g., spherical), serves as the cathode in the electrodeposition process. After or right before the workpiece and the titanium basket anodes are submerged in the bath, a positive terminal of a power supply is connected in electrical contact with the baskets and a negative terminal of the power supply is electrically connected to the workpiece.

A filter pump with a 1-micron particle size cartridge is placed in fluid communication with the bath such that the tank volume can be turned over at least about 4 times per hour. An oscillator or other means of gently moving the workpiece back and forth within the bath is connected to the workpiece to provide high rates of mass transfer to the cathode as well as to dislodge bubbles that may form during electrodeposition.

Also connected to the bath are reservoirs of $FeCl_2$ and sulfamic acid solution and necessary plumbing and flow control to maintain the bath concentration of iron at approximately 0.02M and the pH level at about 3.00 by addition of $FeCl_2$ and sulfamic acid either by a steady predetermined flow rate or by means of a feedback loop.

After the bath is heated to and maintained at a temperature of about 110° F., electrodeposition of the fuel shell layer begins by applying a time-varying current waveform to the workpiece through the power supply according to the following conditions: (a) a current density at a working electrode varies in a square-wave with a nominal maximum plating current of 15 $mA/cm^2$ and a nominal minimum plating current of 3 $mA/cm^2$, based on the nominal area of the workpiece exposed to the plating bath (b) a duty cycle of approximately 12%, with an off corresponding to a current density of 3 $mA/cm^2$ is utilized, and (c) a frequency modulation according to a triangle wave from a peak of 1 Hz to a minimum of 0.001 Hz, with a modulation frequency of 0.0001 Hz is selected.

Electrodeposition of the fuel shell layer occurs for approximately 7 days during which $FeCl_2$ and sulfamic acid solutions are added to the bath to maintain the concentration of iron at about 0.02 M and a pH level of 3.00. In addition, the nickel concentration within the bath is monitored to ensure that it is not in excess of 0.3 M. When the concentration exceeds 0.3 M, an appropriate amount of the bath is removed and the quantities of the original bath solutions (e.g., 0.2M $Ni(NH_2SO_3)_2 \bullet 4H_2O$, 0.2M $FeCl_2 \bullet 4H_2O$, 0.40M $H_3BO_3$, 1.5 g/L sodium saccharin, 0.2 g/L sodium dodecyl sulfate, 1.0 g/L ascorbic acid, and enough sulfamic acid or nickel carbonate to attain a pH level of 3.00±0.01) and deionized water are added to bring the bath solution back to its original state.

After 7 days of electrodeposition using the above process, the workpiece is removed from the bath without turning off the power supply. A wrap or covering of a layer of a conductive fabric (such as, for example, a silverized nylon knit or a carbon non-woven fabric) is layered about the exterior of the workpiece (i.e., the workpiece now includes an interior portion formed of reticulated vitreous carbon, a fuel shell layer of Ni/Fe nanolaminate, and an exterior porous layer of a conductive fabric).

The workpiece is slowly reimmersed into the bath, and electrodeposition of an exterior shell layer of Ni/Fe nanolaminate is deposited using the process described above for about another 7 days. Once complete the vehicle fuel tank is removed from the bath and rinsed with deionized water.

Example 2

A small rectangular composite fuel tank including a 20 PPI (pores per inch) reticulated vitreous carbon foam preform and an electrodeposited compositionally modulated NiFe alloy was formed in a laboratory using the following procedure. A bath was prepared using 0.2M $Ni(H_2NSO_3)_2 \bullet 4H_2O$, 0.04 M $FeCl_2 \bullet 4H_2O$, 0.40M $H_3BO_3$, 1.5 g/L sodium saccharin, 0.2 g/L sodium dodecyl sulfate, 1.0 g/L ascorbic acid, and sulfamic acid to attain a pH of 3.00±0.01. A 10" by 10" by 1" piece of 20 PPI reticulated vitreous carbon foam preform was rigidly mounted in an insulating frame which suspended the preform in the frame's center by a finite number of small conducting elements, or contacts. The contacts were contained and insulated within the frame such that they did not come into contact with the electroplating bath once immersed, and terminated at a single bus located at the top edge of the insulating frame. This bus was in turn connected to two 10 gauge hooks which allowed the entire assembly to hang from a bus bar mounted across the top of a plating tank. The frame was designed to provide electrical contact to the preform while not disturbing the distribution of current over all of the preform's surfaces. Further, the frame provides heft which allows the frame-preform assembly to be immersed in the bath without buoyancy-induced misalignment.

The open-top plating tank had interior dimensions of 12" by 12" by 12", and was spanned over its top by three bus bars separated by 3½". The frame-workpiece assembly was hung from the central bus bar. The two remaining bus bars each supported two titanium anode baskets filled with nickel S-rounds, with each basket measuring 9" tall by 1" thick by 3" wide. The titanium anode baskets were enclosed within a napped polypropylene anode bag to minimize the suspension of anodically formed particles in the plating bath. The plating solution was continuously recycled through a 10", 1 micron filter pump such that the entire tank volume passed through the filter at least three times per hour.

The central, cathodic bus bar was connected to the negative terminal of a 1 kW power supply. The two anodic bus bars were connected to the positive terminal of the same power supply.

Once positioned within the bath, a time-varying current was applied to the workpiece. The time-varying current was designed to have the following waveform characteristics: (1) the current density—based on the nominal surface area of the preform's major faces (2×100 in$^2$)—varied in accordance with a square-wave having a maximum deposition current density of 15 mA/cm$^2$ and a minimum deposition current of 3 mA/cm$^2$; (2) a duty cycle of 0.12 with the "off" part of the cycle corresponding to a current density setting of 3 mA/cm$^2$; and (3) a frequency modulation according to a triangle waveform having a peak of 1 Hz, a minimum of 0.001 Hz, and a modulation rate of 0.0001 Hz. The time-varying current was applied to the working electrode for three days while maintaining the bath's iron composition and pH at 0.02M and 3.0, respectively, by automated addback of iron chloride solution and sulfamic acid solution.

After three days, the preform was removed and wrapped several times in tight-weave silverized nylon cloth. The workpiece was then re-immersed in the plating bath and the plating regime described above was continued for another three days, after which the workpiece was removed and thoroughly rinsed in DI water.

Example 3

A small rectangular composite fuel tank including a 20 PPI (pores per inch) reticulated vitreous carbon foam preform and an electrodeposited nickel reinforcement was formed in a laboratory using the following procedure.

A commercial nickel sulfamate plating bath was purchased from Technic, Inc. A 10" by 10" by 1" piece of 20 PPI reticulated vitreous carbon foam preform was rigidly mounted in an insulating frame which suspended the preform in the frame's center by a finite number of small conducting elements, or contacts. The contacts were contained and insulated within the frame such that they did not come into contact with the electroplating bath once immersed, and terminated at a single bus located at the top edge of the insulating frame. This bus was in turn connected to two 10 gauge hooks which allowed the entire assembly to hang from a bus bar mounted across the top of a plating tank. The frame was designed to provide electrical contact to the preform while not disturbing the distribution of current over all of the preform's surfaces. Further, the frame provides heft which allows the frame-preform assembly to be immersed in the bath without buoyancy-induced misalignment.

The open-top plating tank had interior dimensions of 12" by 12" by 12", and was spanned over its top by three bus bars separated by 3½". The frame-workpiece assembly was hung from the central bus bar. The two remaining bus bars each supported two titanium anode baskets filled with nickel S-rounds, with each basket measuring 9" tall by 1" thick by 3" wide. The titanium anode baskets were enclosed within a napped polypropylene anode bag to minimize the suspension of anodically formed particles in the plating bath. The plating solution was continuously recycled through a 10", 1 micron filter pump such that the entire tank volume passed through the filter at least three times per hour.

The central, cathodic bus bar was connected to the negative terminal of a 1 kW power supply. The two anodic bus bars were connected to the positive terminal of the same power supply.

Once positioned within the bath, a DC current density of 3 mA/cm$^2$ was applied to the workpiece—based on the nominal surface area of the preform's major faces (2×100 in$^2$). Plating continued for three days while maintaining the bath chemistry at the manufacturer's recommended makeup concentrations.

After three days, the preform was removed and wrapped several times in tight-weave silverized nylon cloth. The workpiece was then re-immersed in the plating bath and the plating regime described above was continued for another three days, after which the workpiece was removed and thoroughly rinsed in DI water.

Example 4

A cylindrical composite fuel tank including a 80 PPI (pores per inch) reticulated vitreous carbon foam preform and an electrodeposited compositionally modulated NiFe alloy was formed in a laboratory using the following procedure. A bath was prepared using 0.2M Ni(H$_2$NSO$_3$)$_2$.4H$_2$O, 0.04 M FeCl$_2$.4H$_2$O, 0.40M H$_3$BO$_3$, 1.5 g/L sodium saccharin, 0.2 g/L sodium dodecyl sulfate, 1.0 g/L ascorbic acid, and sulfamic acid to attain a pH of 3.00±0.01. A cylindrical piece of 80 PPI reticulated vitreous carbon foam measuring 10" long and having a diameter of 3" was penetrated to a depth of 9 inches along its axis by a stainless steel tube having a diameter of 2". The center portion of the foam contained within the tube was subsequently removed, and the free end of the tube was affixed to a rotator. A metal brush was placed in contact with the free end of the tube, and further connected to the negative terminal of a 1 kW power supply.

An open-topped plating tank having interior dimensions of 12" by 12" by 12" and spanned over its top by two bus bars separated by 7" was filled with plating bath. The two bus bars each supported two titanium anode baskets filled with nickel S-rounds, with each basket measuring 9" tall by 1" thick by 3" wide. The titanium anode baskets were enclosed within a napped polypropylene anode bag to minimize the suspension of anodically formed particles in the plating bath. The plating solution was continuously recycled through a 10", 1 micron filter pump such that the entire tank volume passed through the filter at least three times per hour.

The two anodic bus bars were connected to the positive terminal of the same power supply.

The foam-encased portion of the assembly was immersed in the plating bath.

Once positioned within the bath, the workpiece was rotated at a time-varying rotation speed while a time-varying current was applied to the workpiece. The current waveform was designed to have the following waveform characteristics: (1) the current density—based on the nominal surface area of the preform—varied in accordance with a square-wave having a maximum deposition current density of 15 mA/cm$^2$ and a minimum deposition current of 3 mA/cm$^2$; (2) a duty cycle of 0.12 with the "off" part of the cycle corresponding to a current density setting of 3 mA/cm$^2$; and (3) a frequency modulation according to a triangle waveform having a peak of 1 Hz, a minimum of 0.001 Hz, and a modulation rate of 0.0001 Hz. The time-varying rotation rate was synchronized with the current waveform, but varied such that the short-duration portion of the rotation rate waveform was 50 RPM and the long-duration portion was 200 RPM. The current was applied to the workpiece for three days while maintaining the bath's iron composition and pH at 0.02M and 3.0, respectively, by automated addback of iron chloride solution and sulfamic acid solution.

After three days, the preform was removed and wrapped several times in tight-weave silverized nylon cloth. The workpiece was then re-immersed in the plating bath and the plating regime described above was continued for another three days, after which the workpiece was removed and thoroughly rinsed in DI water.

Example 5

A composite fuel tank comprising a porous baffle material affixed to a nonporous shell may be formed in a laboratory using the following procedure.

A bath is prepared using 0.4M $Ni(H_2NSO_3)_2 \cdot 4H_2O$, 0.04 M $FeCl_2 \cdot 4H_2O$, 0.40M $H_3BO_3$, 1.5 g/L sodium saccharin, 0.2 g/L sodium dodecyl sulfate, 1.0 g/L ascorbic acid, 1-5 wt % magnetic fibers or particles (e.g. particles of iron, cobalt, nickel, or alloys thereof), and sulfamic acid to attain a pH of 3.00±0.01.

An open-topped plating tank having interior dimensions of 12" by 12" by 12" and spanned over its top by three bus bars separated by 3½" was filled with plating bath. The central bus bars supported a magnetic preform shell of the desired shape, while the remaining two bars supported two titanium anode baskets filled with nickel S-rounds, with each basket measuring 9" tall by 1" thick by 3" wide. The titanium anode baskets were enclosed within a napped polypropylene anode bag to minimize the suspension of anodically formed particles in the plating bath. The plating solution was unfiltered.

The two anodic bus bars were connected to the positive terminal of a 1 kW power supply. The central bus bar was connected to the negative terminal of the same power supply.

After establishing electrical connections to the magnetic workpiece and the anodes, the workpiece was slowly immersed in the plating bath. The magnetic particles were drawn to the workpiece such that they formed a porous preform that became consolidated by the applied electroplate. The applied current waveform was designed to have the following waveform characteristics: (1) the current density—based on the nominal surface area of the preform—varied in accordance with a square-wave having a maximum deposition current density of 15 $mA/cm^2$ and a minimum deposition current of 3 $mA/cm^2$; (2) a duty cycle of 0.12 with the "off" part of the cycle corresponding to a current density setting of 3 $mA/cm^2$; and (3) a frequency modulation according to a triangle waveform having a peak of 1 Hz, a minimum of 0.001 Hz, and a modulation rate of 0.0001 Hz. The current was applied to the workpiece for three days while maintaining the bath's iron composition and pH at 0.02M and 3.0, respectively, by automated addback of iron chloride solution and sulfamic acid solution. Also, magnetic fibers/particles were periodically added to the plating bath to build upon the existing porous baffle.

After three days, the preform was removed and wrapped several times in tight-weave silverized nylon cloth. The workpiece was then re-immersed in the plating bath. The plating bath during this latter portion of plating was continuously recycled through a 10", 1 micron polypropylene filter cartridge such that the entire bath volume passed through the filter at least 3 times per hour. No additional magnetic fibers/particles were added during this portion of the deposition. After an additional three days of plating, the workpiece was removed and thoroughly rinsed in DI water.

What is claimed:

1. A method of producing a fuel tank, the method comprising: laying a conductive porous preform in contact with an inside surface of a fuel tank vessel; filling the vessel with an electrolyte bath including one or more electrodepositable materials; creating a current pathway by attaching a first electrode to the porous preform and disposing a second electrode in the electrolyte bath; and applying power to the first and second electrodes to form a nanolaminate coating on the porous preform.

2. The method according to claim 1, further comprising: melting or etching the porous preform to form a porous nanolaminate structure.

3. The method according to claim 1, wherein the nanolaminate coating is a corrosion resistant protective alloy.

4. A method for forming a fuel tank, the method comprising: providing a bladder in the form of a final fuel tank form; lining an interior of the bladder with a porous preform including an accessible interior void structure; connecting the porous preform to a first electrode; filling the bladder with a bath including at least two electrodepositable species; inserting a second electrode into the bath; and applying a voltage or current to the first electrode to electrodeposit a material within the accessible interior void structure of the porous preform.

5. The method of claim 4, wherein the preform possesses a gradient in porosity or the preform comprises a consolidated material.

6. The method of claim 4 further comprising: electrodepositing a compositionally modulated layer on an exterior surface of the porous preform.

7. The method of claim 4, wherein the preform comprises a consolidated material.

8. The method of claim 7, wherein the consolidated material is selected from the group consisting of a foam, felt, and honeycomb.

9. The method of claim 4, wherein the preform comprises an unconsolidated material.

10. The method of claim 9, wherein the unconsolidated material comprises a bed of particles or beads.

11. The method of claim 4, wherein the voltage or current varies with time.

\* \* \* \* \*